(12) United States Patent
Chesnutt

(10) Patent No.: US 9,838,837 B2
(45) Date of Patent: Dec. 5, 2017

(54) POWER-EFFICIENT LOCATION ESTIMATION

(71) Applicant: Google Inc., Mountain View, CA (US)

(72) Inventor: Stanley Chesnutt, Mountain View, CA (US)

(73) Assignee: Google LLP, Mountain View, CA (US)

( * ) Notice: Subject to any disclaimer, the term of this patent is extended or adjusted under 35 U.S.C. 154(b) by 193 days.

(21) Appl. No.: 14/685,198

(22) Filed: Apr. 13, 2015

(65) Prior Publication Data

US 2016/0302032 A1    Oct. 13, 2016

(51) Int. Cl.
| | | |
|---|---|---|
| *H04W 24/00* | (2009.01) | |
| *H04W 4/02* | (2009.01) | |
| *H04W 52/02* | (2009.01) | |
| *H04W 48/16* | (2009.01) | |
| *H04W 64/00* | (2009.01) | |

(52) U.S. Cl.
CPC ............. *H04W 4/02* (2013.01); *H04W 48/16* (2013.01); *H04W 52/0209* (2013.01); *H04W 64/00* (2013.01); *Y02B 80/50* (2013.01)

(58) Field of Classification Search
CPC ..................................................... G01C 21/00
See application file for complete search history.

(56) References Cited

U.S. PATENT DOCUMENTS

| | | | |
|---|---|---|---|
| 8,103,441 B2 | 1/2012 | Callaghan et al. | |
| 8,140,094 B2 | 3/2012 | Morgan et al. | |
| 8,204,966 B1 | 6/2012 | Mendis et al. | |
| 8,374,782 B2 | 2/2013 | Santesson et al. | |
| 8,598,984 B2 | 12/2013 | Chhabra et al. | |
| 8,700,376 B2 | 4/2014 | Ophir et al. | |
| 8,711,181 B1 | 4/2014 | Nourse et al. | |
| 8,805,360 B2 | 8/2014 | Nagaraj | |
| 2008/0176583 A1 | 7/2008 | Brachet et al. | |
| 2010/0287178 A1 | 11/2010 | Lambert et al. | |
| 2011/0205946 A1 | 8/2011 | Avital et al. | |
| 2012/0315941 A1* | 12/2012 | Andgart ................ | H04W 48/16 455/509 |
| 2013/0124563 A1 | 5/2013 | Cavelie et al. | |
| 2013/0177208 A1 | 7/2013 | Haverinen | |
| 2013/0331118 A1 | 12/2013 | Chhabra et al. | |
| 2014/0036768 A1 | 2/2014 | Gao et al. | |
| 2014/0185518 A1 | 7/2014 | Ramakrishnan et al. | |

(Continued)

Primary Examiner — Huy D Vu
Assistant Examiner — Kevin Cunningham
(74) Attorney, Agent, or Firm — McDonnell Boehnen Hulbert & Berghoff LLP

(57) ABSTRACT

A wireless computing device may scan a frequency set. A first group of base stations may use the frequencies in the frequency set. Based on information relating to one or more base stations in the first group of base stations, the wireless computing device may estimate its location. The wireless computing device may further select a frequency subset of the frequency set. A second group of base stations may use the frequencies of the frequency subset. Based on information relating to one or more base stations in the second group of base stations, the wireless computing device may again estimate its location. If the two estimated locations are within a threshold distance of one another, the wireless computing device may perform, during a subsequent location-estimating operation, an additional frequency scan using the frequency subset.

20 Claims, 5 Drawing Sheets

(56) References Cited

U.S. PATENT DOCUMENTS

| | | | | |
|---|---|---|---|---|
| 2014/0211691 A1* | 7/2014 | Emadzadeh | .......... | H04W 64/00 370/328 |
| 2014/0243013 A1* | 8/2014 | Liu | .................... | H04W 64/003 455/456.1 |
| 2014/0266911 A1* | 9/2014 | Sendonaris | ............. | G01S 11/04 342/458 |

* cited by examiner

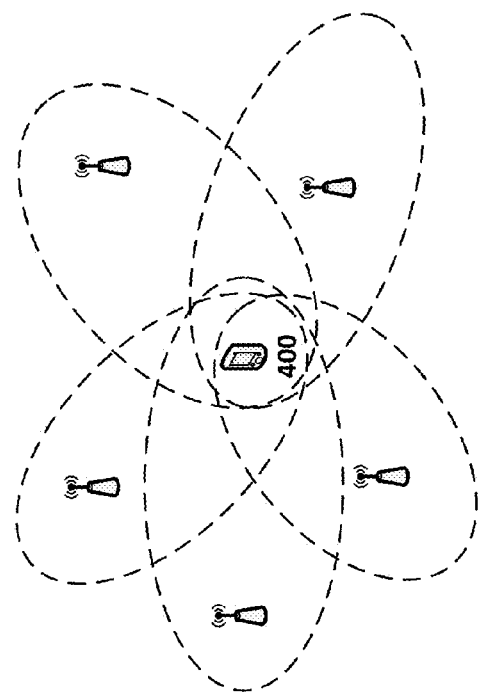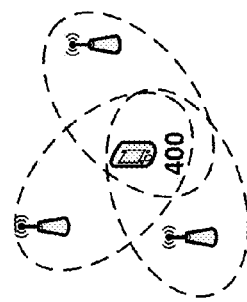
FIG. 4A  FIG. 4B  FIG. 4C  FIG. 4D

POWER-EFFICIENT LOCATION ESTIMATION

BACKGROUND

To estimate the location of a device, such as a cell phone, tablet, laptop computer, or another type of wireless computing device, it may be desirable to obtain information that can facilitate such estimation. Global Positioning System (GPS) data may be used for this purpose, but might not be available in some indoor settings, and may also use a relatively large degree of power. Other types of location information can be used, such as local-area wireless coverage area information (e.g., Wifi access point or Bluetooth emitter coverage) in the vicinity of the device, but the process of discovering these local-area wireless coverage areas may use a relatively large degree of power as well.

SUMMARY

Various types of location information may exist. For instance, in addition to GPS data, cellular network wireless coverage area information, local-area wireless coverage area information, and magnetic field pattern information can be used to estimate the location of a device. In some cases, one or more of these types of location information may be used to achieve that goal. Some kinds of local-area wireless coverage area information may be particularly useful, as Wifi access points are widely deployed, and are typically available in indoor settings where GPS signals fail to reliably penetrate.

In order to determine nearby Wifi access points, a device may scan a number of Wifi frequencies for access point signals. Performing this scan can be time consuming, and requires a relatively large extent of power. Since many Wifi-enabled devices are battery-powered, such frequency scanning can have a deleterious impact on battery life. Thus, it is desirable to reduce the amount of power used in frequency scanning, while still discovering enough access points such that the device can perform a reasonably accurate estimation of its location.

In a first example embodiment, a wireless computing device may scan a frequency set. A first group of base stations may use the respective frequencies in the frequency set. Possibly based on information relating to one or more base stations in the first group of base stations, the wireless computing device may estimate a first location of the wireless computing device. The wireless computing device may further select a frequency subset of the frequency set. The frequency subset may include at least one frequency in the frequency set and may exclude at least one frequency in the frequency set. A second group of base stations may use the respective frequencies of the frequency subset, where the second group of base stations is a subset of the first group of base stations. Possibly based on information relating to one or more base stations in the second group of base stations, the wireless computing device may estimate a second location of the wireless computing device. It may be determined that the first location and the second location are within a threshold distance of one another. Possibly based on the first location and the second location being within a threshold distance of one another, the wireless computing device may perform, during a subsequent location-estimating operation, an additional frequency scan using the frequency subset.

In a second example embodiment, an article of manufacture may include a non-transitory computer-readable medium, having stored thereon program instructions that, upon execution by a computing device, cause the computing device to perform operations in accordance with the first example embodiment.

In a third example embodiment, a computing device may include at least one processor, as well as data storage and program instructions. The program instructions may be stored in the data storage, and upon execution by the at least one processor may cause the computing device to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 4A illustrates a wireless computing device in the range of several cellular base stations, according to an example embodiment.

FIG. 4B illustrates a wireless computing device in the range of a Wifi access point, according to an example embodiment.

FIG. 4C illustrates a wireless computing device in the range of several Wifi access points, according to an example embodiment.

FIG. 4D illustrates a wireless computing device in the range of a larger number of Wifi access points, according to an example embodiment.

DETAILED DESCRIPTION

Figure 1:
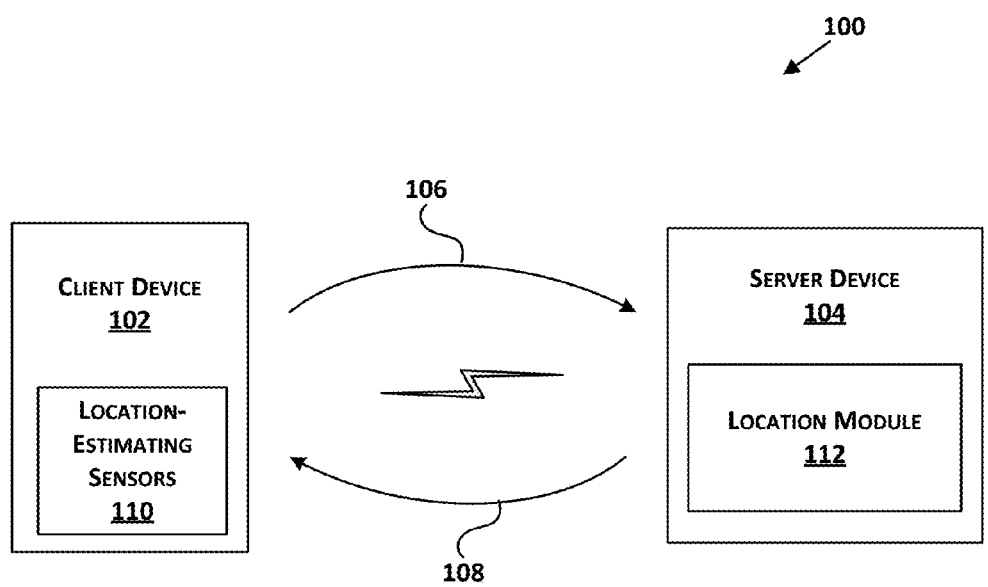
FIG. 1 depicts a client/server networked environment, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

1. Overview

Various procedures may be carried out on a computing device to estimate a location of the computing device. For example, consider a scenario in which a computing device, such as a wireless computing device (WCD), displays a map including the estimated location of the WCD. In particular, the map may display a dot representing this estimated location. In some instances, a GPS application may be running on the WCD to determine the estimated location. However, the GPS application might not display the dot on the map accurately, possibly due to a building or other structure preventing a clear GPS signal from reaching the WCD. As such, the dot may "jump" around on the map, making it difficult to ascertain the actual location of the WCD. Further, GPS applications typically use a significant amount of power, possibly draining the battery of the WCD at an undesirable rate.

In such instances, other types of location information may be used to facilitate estimating the location of the WCD. These types may include local-area wireless (e.g., Wifi or Bluetooth) coverage area information. Particularly, when a WCD is indoors and more likely to suffer from poor GPS coverage, the WCD may be able to use information related to local-area wireless base stations (e.g., Wifi access points or Bluetooth emitters) to provide an improved estimate of the WCD's location. Even when a WCD is outdoors and is able to receive GPS signals, it may be advantageous to use local-area wireless coverage area information in order to conserve battery life during location-estimating procedures.

The embodiments herein provide example procedures, WCDs, computing devices, and systems for reducing the power requirements (and therefore the negative impact on battery life) of location-estimation. The next section describes illustrative examples of such WCDs, computing devices, server devices, and systems.

2. Example WCDs, Computing Devices, and Systems

FIG. 1 illustrates an example communication system 100 for carrying out one or more of the embodiments described herein. Communication system 100 may include computing devices. Herein, a "computing device" may refer to either a client device (e.g., a WCD), a server device (e.g., a networked cluster of server equipment), or some other type of computational platform.

Client device 102 may be any type of device including a laptop computer, a wearable computing device, a WCD, a head-mountable computing device, a mobile telephone, or tablet computing device, etc., that is configured to transmit data 106 to and/or receive data 108 from a server device 104 in accordance with the embodiments described herein. For example, in FIG. 1, client device 102 may communicate with server device 104 via one or more wireless interfaces. In some cases, client device 102 and server device 104 may communicate with one another via a local-area network. Alternatively, client device 102 and server device 104 may each reside within a different network, and may communicate via a wide-area network, such as the Internet.

Client device 102 may include a user interface, a communication interface, a processor, and data storage (e.g., memory). The data storage may contain instructions executable by the processor for carrying out one or more operations relating to the data sent to, or received from, server device 104. The user interface of client device 102 may include buttons, a touchscreen, a microphone, and/or any other elements for receiving inputs, as well as a speaker, one or more displays, and/or any other elements for communicating outputs. Client device 102 may include location-estimating sensors 110 (e.g., a GPS transceiver, a Wifi interface, and/or a compass) that can be used to assist in estimating the location of client device 102.

Server device 104 may be any entity or computing device arranged to carry out the server operations described herein. Further, server device 104 may be configured to send data 108 to and/or receive data 106 from the client device 102. Server device 104 may include a location module 112 which may be configured to process data 106 received from the client device 102 to facilitate determination of one or more estimated locations (present and/or historical) associated with client device 102. In some cases, location module 112 may include a database of location information, and may be incorporated into server device 104 (as shown in FIG. 1) or may exist separately from server device 104.

Data 106 may take various forms. For example, client device 102 may provide information indicative of an approximate location of client device 102, movement of client device 102, base stations detected by client device 102, and/or inputs from a user of client device 102. Server device 104 may then process data 106 to identify location information related to the received data 106.

Data 108 may also take various forms. For example, server device 104 may send client device 102 an indication of one or more estimated locations of client device 102, or information regarding base stations in the vicinity of client device 102. Thus, in some embodiments, data 108 may include location-estimation information (e.g., local-area wireless coverage area information) that client device 102 can use to develop a more accurate estimate of its location.

Figure 2:
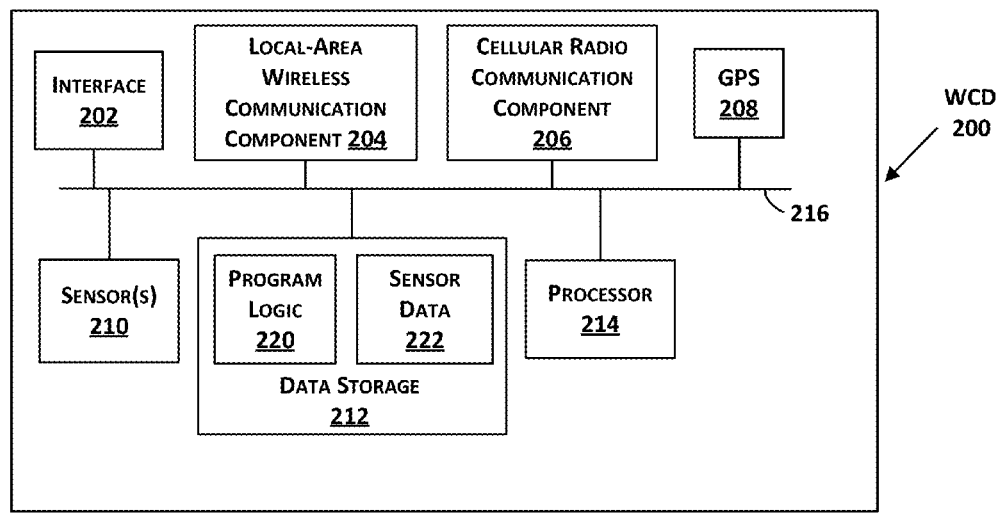
FIG. 2 illustrates a schematic drawing of a client device, according to an example embodiment.

FIG. 2 illustrates a schematic drawing of an example WCD 200, where WCD 200 is an example embodiment of client device 102. Thus, WCD 200 may, for example, take the form of any client device described above in relation to FIG. 1. In some examples, components illustrated in FIG. 2 may be distributed across multiple client devices. Nonetheless, for illustrative purposes, components are shown and described in FIG. 2 as part of an example WCD 200.

In some implementations, WCD 200 may include a device platform or operating system (not shown). The device platform may include different applications and an application framework, as well as various kernels, schedulers, memory managers, libraries, and runtime entities. In some examples, other formats or systems may operate on WCD 200 as well.

WCD 200 may include an interface 202, a local area wireless communication component 204, a cellular radio communication component 206, a GPS component 208, sensor(s) 210, data storage 212, and a processor 214. Components illustrated in FIG. 2 may be linked together by a communication bus 216. WCD 200 may also include additional hardware to enable further functionality and/or operations.

Interface 202 may be configured to allow a user to interact with WCD 200. Thus, interface 202 may include user-interface components, such as a keyboard, microphone, touchscreen, touchpad, presence-sensitive input device, display, speaker, etc.

Local-area wireless communication component 204 may be a communication interface that is configured to facilitate wireless data communication according to one or more wireless communication standards or non-standard protocols. For example, local-area wireless communication component 204 may include a Wifi communication component that is configured to facilitate wireless data communication according to one or more Institute of Electrical and Electronics Engineers (IEEE) 802.11 protocols. As another example, local-area wireless communication component 204 may include a Bluetooth communication component that is configured to facilitate wireless data communication according to one or more Bluetooth protocols. Other examples are also possible.

Cellular radio communication component 206 may be a communication interface that is configured to facilitate wireless data and/or voice communication according to one or more wide-area wireless communication standards or non-standard protocols. For example, cellular radio communication component 206 may be configured to facilitate wireless data communication according to Code Division Multiple Access (CDMA), Worldwide Interoperability for Microwave Access (WIMAX), Universal Mobile Telecommunications System (UMTS), Long Term Evolution (LTE), or other protocols now known or later developed.

GPS component 208 may be a GPS transceiver configured to receive GPS signals from one or more satellites, and to estimate a location of WCD 200. Sensor(s) 210 may include one or more of an accelerometer, gyroscope, magnetometer, inertial measurement unit (IMU), compass, pedometer, light sensor, microphone, camera, and/or other location and/or context-aware sensors.

Data storage 212 may store program logic 220 that can be accessed and executed by processor 214. Program logic 220 may include machine-readable instructions that, when executed by processor 214, cause WCD 200 to carry out various operations and procedures. Data storage 212 may also store collected sensor data 222 that may include data collected by any of local-area wireless communication component 204, cellular radio communication component 206, GPS 208, and/or any of sensors 210. Data storage 212 may store additional data as well. Data storage 212 may be a non-transitory computer-readable data medium, such as a hardware memory module.

Processor 214 may be any type of one or more microprocessors or general-purpose processors. However, processor 214 may be integrated with or include various types of co-processors, network processors, graphics processors, and/or digital logic.

Communication bus 216 is illustrated as a wired connection; however, wireless connections may also be used. For example, communication bus 216 may be a wired serial bus, such as a universal serial bus (USB), a parallel bus, or a wireless connection using, e.g., short-range wireless radio technology, communication protocols described in IEEE 802.11 (including any IEEE 802.11 revisions), or cellular technology, among other possibilities.

Figure 3:
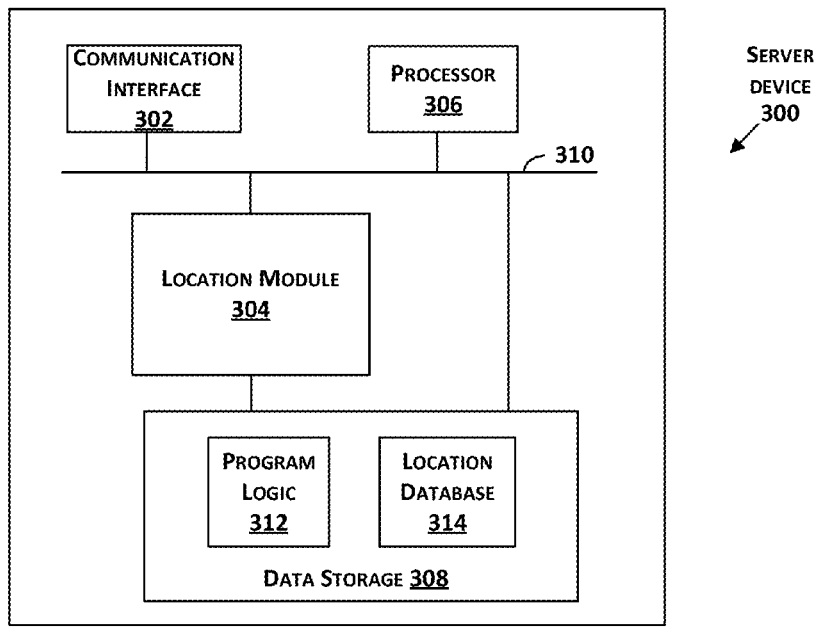
FIG. 3 illustrates a schematic drawing of a server device, according to an example embodiment.

FIG. 3 illustrates a schematic drawing of another example computing device, server device 300. In examples, some components illustrated in FIG. 3 may be distributed across multiple servers. However, for the sake of illustration and simplicity, the components are shown and described as part of one example server device 300. Server device 300 may be a computing device, cloud-based server, or similar entity that may be configured to perform the functions described herein.

Server device 300 may include a communication interface 302, a location module 304, a processor 306, and data storage 308. All of the components illustrated in FIG. 3 may be linked together by a communication bus 310 (e.g., a wired or wireless link).

Communication interface 302 may allow server device 300 to communicate with another device (not shown), such as a WCD described above in relation to FIG. 2. Thus, communication interface 302 may be configured to receive input data from one or more computing devices, and may also be configured to send output data to the one or more computing devices (e.g., WCDs or other types of client devices).

Location module 304 may be configured to receive data from a client device (e.g., a WCD or another type of client device) and determine an approximate geographic location of the client device. The determination may be based on the data received from the client device, the data being information relating to base stations, and/or from sensors of the client device. Location module 304 may include program logic or digital logic that interacts with location information stored in location database 314. As a possible example, location module 304 may receive, from a client device, identifiers of one or more Wifi access points. Location module 304 may look up these Wifi access points in location database 314, and provide, to the client device, additional information regarding these access points.

Location module 304 may alternatively reside in WCD 200. The elements of this module may function in either device, and some embodiments can have location module 304 in server device 300, WCD 200, or with portions in both. Likewise, program logic 220 of WCD 200 may also include program logic that conducts the operations of location module 304. To that point, communications between WCD 200 and server device 300 may convey portions of location database 314 to data storage 212 of WCD 200, for use by a local embodiment of the location module 304.

Data storage 308 may store program logic 312 that can be accessed and executed by processor 306. Data storage 308 may also include location database 314 that can be accessed by processor 306 as well, for example, to retrieve location information. Like data storage 212, data storage 308 may be a non-transitory computer-readable data medium, such as a hardware memory module. Also, like processor 214, processor 306 may be any type of one or more microprocessors or general-purpose processors, and may be integrated with or include various types of co-processors, network processors, graphics processors, and/or digital logic.

Location database 314 may include or have access to one or more databases of location information. This information may include, but is not limited to, digital representations of maps, locations of cellular base stations and/or wireless coverage areas defined by these base stations, locations of Wifi access points and Bluetooth (including Bluetooth Low Energy) emitters, and/or wireless coverage areas defined by these access points and emitters. Some additional types of information may include whether the base stations have been observed to be fixed or mobile, base station signal strength fingerprint information, base station round-trip delay fingerprint information, and so on. In some embodiments, location database 314 is stored separately from server device 300, for instance in a distinct physical location and/or on a distinct physical device. Some possible content of location database 314 is described in more detail below.

For sake of simplicity, the terms "base station" and "access point" will be used herein to include any type of wireless transceiver, including but not limited those operating in accordance with cellular protocols, Wifi protocols, Bluetooth protocols, or any other protocol now known or developed in the future.

3. Example Location Information

A device with a GPS receiver may estimate its position from signals transmitted by GPS satellites. Based on the times that each signal was transmitted and the transmitting satellite's position at these times, the GPS receiver may compute its distance to each satellite (e.g., based on this timing information and the speed of light).

Typically, a GPS receiver uses signals from four or more satellites to obtain an accurate estimate of its location. This location might include both a position on the surface of the earth (e.g., longitude and latitude), as well as an altitude. Some GPS receivers take multiple location measurements to infer their velocity and direction of movement.

GPS signals typically use microwave transmission, which is often not suitable for indoor reception. For instance, microwaves can be attenuated and scattered by the roofs and walls of various types of structures. As an example, when a user of a WCD is outside of a structure, such as in the parking lot of an airport, the WCD might receive strong GPS signals. However, when the user moves into the airport, the WCD might be unable to accurately resolve its location using just GPS. Thus, other types of location information might be used for this purpose.

An overview of several additional types of location information is provided below.

A. Cellular Wireless Coverage Area Information

Many locations worldwide, especially heavily-populated locations, are served by one or more cellular networks. Each of these cellular networks may provide telephony and/or data services to subscribed WCDs within their respective coverage areas. To do so, these cellular networks include multiple base stations, each radiating on one or more carrier frequencies to define one or more wireless coverage areas.

In operation, a WCD may receive pilot signals and/or other signaling or bearer traffic from one or more wireless coverage areas. In this way, the WCD can measure the strengths at which it receives these signals, in order to determine, for instance, when to request a handover from one wireless coverage area to another.

When a WCD receives signals from three or more wireless coverage areas, the WCD may be able to estimate its location through triangulation of these signals. An example of being able to provide a reasonable estimate of a WCD's location is shown in FIG. 4A. WCD 400 is within range of three wireless coverage areas, each wireless coverage area defined by a different cellular base station.

Triangulation may involve the WCD estimating the distance between itself and each of the three or more base stations. Such an estimate may be based on received signal strengths from these base stations and/or the round-trip time of the received signals. In order to perform the estimate, the location information may contain associations of base stations (e.g., base station identifiers) and/or wireless coverage areas (e.g., sector identifiers) with physical locations (e.g., latitude, longitude, and/or altitude). In some embodiments, more than one wireless coverage area per base station may be used.

Depending on the density of base stations surrounding the WCD, estimates of the WCD's location may have an accuracy within a few hundred feet to a mile of the WCD's actual location. In urban environments, base station deployments may be very dense, but reflections and interference from "urban canyon" environments may further reduce the accuracy of this technique.

B. Sparse Local-area Wireless Coverage Area Information

Given the widespread deployment of local area wireless networking equipment (e.g. Wifi access points), it may be possible to use this equipment to estimate the location of a WCD. For instance, a database of access point coverage may be developed. This database may include indications of each access point's service set identifier (SSID), basic service set identifier (BSSID), and/or its medium access control (MAC) address. Serial numbers and/or IP addresses assigned to access points may also be included. These parameters may be associated with the physical location (e.g., latitude, longitude, and/or altitude) of each respective access point. Additionally, aside from using Wifi access point information for location purposes, other types of wireless network technology may be used, such as Bluetooth and/or near-field communication (NFC).

In some settings, access point deployment may be sparse; for instance, a WCD may be within range of only one or two access points. Based on information in the database, the WCD's general location may be able to be determined. For example, using sparse local-area wireless coverage area information, the WCD's location may be determined to be in or near a particular building, with within or near some subset of locations within the building. For instance, the WCD's location may be estimated within a few tens or hundreds of feet.

An example of using this type of location information is shown in FIG. 4B. WCD 400 is within range of just one access point. Thus, the location of WCD 400 may be estimated based on the location of the access point as stored in a location database, and/or the strength at which WCD 400 receives signals from the access point.

C. Semi-sparse Local-area Wireless Coverage Area Information

In some environments, such as airports, office buildings, or commercial buildings, multiple Wifi access points may be deployed such that their respective wireless coverage areas overlap to some extent. In these less sparse deployments, triangulation may be used with these access points to more accurately estimate the location of the WCD. As was the case for sparse local-area wireless coverage area information, other types of wireless network technology may be used, such as Bluetooth and/or NFC.

For example, as shown in FIG. 4C, a WCD 400 may use three (or more) nearby access points to determine its location. As described above for cellular triangulation, the WCD may estimate the distance between itself and the access points based on received signal strengths from these access points and/or estimates of the round-trip delays between the WCD and the access points. Thus, the WCD may measure the strength at which it receives signals from the access points, and/or may use a "ping"-like utility to measure the round-trip delays between itself and the access point.

Using local-area wireless area coverage triangulation information, the WCD's location may be determined to be in or near a particular part of a building, or within or near one or more rooms of the building. For instance, the WCD's location may be estimated within a few dozen feet.

D. Dense Local-area Wireless Coverage Area Information

In some physical settings, such as heavily used office buildings, apartment complexes, and so on, a large number of Wifi access points may be present. In these environments, a three-dimensional (3D) map of the locations of the access points may be developed. For instance, a "fingerprint" of a particular access point may be determined based on the strength at which signals from the access point can be received at various locations in 3D space. In some cases, the map may include the received signal strengths and/or round-trip delays expected at various positions in the 3D space.

For example, as shown in FIG. 4D, a WCD 400 may use several nearby access points to determine its location. WCD 400 may have access to a signal strength map of at least one of the respective wireless coverage areas. For this wireless coverage area, the map may indicate that received signal strength is typically between values S1 and S2 (where S1>S2) when a WCD is up to 10 feet from the access point, between values S2 and S3 (where S2>S3) when the WCD is between 10 and 20 feet from the access point, and so on. In combination with similar information regarding other access points, and possibly triangulation as well, a WCD may be able to be located in 3D space to an accuracy within 10 feet.

4. Frequency Scanning and Identification of Nearby Base Stations

As noted above, a WCD may determine the presence of nearby base stations by scanning the frequencies in frequency bands on which such base stations are configured to transmit. For purposes of simplicity, the following discussion will focus on an example embodiment in which the base stations are Wifi access points. However, the same or similar procedures may be used for determining the presence of other types of base stations (e.g., cellular or Bluetooth base stations).

Additionally, a WCD may detect "nearby" base stations, in that the WCD may be able to detect only those base stations for which the WCD can receive signals. Thus, the term "nearby" may be defined to include base stations detected in such a fashion, with the understanding that received wireless signal strengths may fluctuate from time to time based on movement of the WCD and wireless channel conditions. As a result, the detected base stations "nearby" the WCD may change over time.

TABLE 1

| 2.4 GHz Wifi Channel Number | Center Carrier Frequency (GHz) |
| --- | --- |
| 1 | 2.412 |
| 2 | 2.417 |
| 3 | 2.422 |
| 4 | 2.427 |
| 5 | 2.432 |
| 6 | 2.437 |
| 7 | 2.442 |
| 8 | 2.447 |
| 9 | 2.452 |
| 10 | 2.457 |
| 11 | 2.462 |

Wifi, as defined by the IEEE in the 802.11 family of standards, may include multiple frequency bands each consisting of one or more logical channels associated with particular carrier frequencies. As an example, Wifi base stations may use the 2.4 Gigahertz (GHz) band for communication with WCDs. In North America, this band includes 11 distinct channels, associated pairwise with 11 central carrier frequencies. A list of these channels and their carrier frequencies is provided in Table 1.

In order to determine nearby Wifi access points, a WCD may scan these frequencies in any order. Assuming that the WCD scans the frequencies in ascending order, the WCD may first tune to 2.412 GHz, and listen on this frequency for some period of time to determine whether there are one or more base stations transmitting on the frequency. Alternatively or additionally, the WCD may transmit one or more probe requests to each base station, in an attempt to elicit a response from the base stations. For each base station the WCD detects, the WCD may attempt to obtain an associated identifier, such as an SSID, BSSID, and/or MAC address. Other identifiers, such as serial numbers or Internet Protocol (IP) addresses may be used instead of or as well as these identifiers. The WCD may continue by scanning the next frequencies in ascending order, and repeating this process for each frequency scanned.

For each base station identified during such a scan, the WCD may also measure the strength at which it receives signals from the base station. These measurements may be of a received signal strength indicator (RSSI), representing RF power measured over the preamble of a received Wifi frame, or a received channel power indicator (RCPI), representing RF power measured over the preamble and the rest of the received frame. Both RSSI and RCPI may be represented using various scales and techniques. For instance, some Wifi devices may estimate RSSI received power level in dBm, but not all are calibrated similarly (e.g., so that 0 dBm is 1 mW). Other Wifi devices may estimate RSSI on a scale of 0 to n, where higher values represent stronger received signals.

For purposes of simplicity, in the embodiments here, received signal strength will be presented on a linear scale of 0 to 100, with higher values representing stronger received signals. These representations will be used with the understanding that RSSI and RCPI measurements may take on different values and/or ranges based on the configuration of the measuring WCD.

TABLE 2

| Center Carrier Frequency (GHz) | Discovered Base Station SSID(s) and signal strengths |
| --- | --- |
| 2.412 | Showroom (43), BOB (12) |
| 2.417 | |
| 2.422 | |
| 2.427 | |
| 2.432 | |
| 2.437 | FreeWiFi (97) |
| 2.442 | |
| 2.447 | |
| 2.452 | |
| 2.457 | |
| 2.462 | Banana_LHA (50), DS-store (24), Karens (79) |

After scanning some or all of the 11 carrier frequencies, the WCD may have collected information related to a group of base stations transmitting thereon. In some cases, the scan will result in no base stations being discovered. However, in many practical situations, one or more base stations may be discovered. Thus, the WCD may discover different numbers of base stations in spare, semi-sparse, and dense local-area wireless coverage area scenarios.

An example of discovered base stations is shown in Table 2. A WCD discovered two base stations on the frequency of 2.412 GHz, one base station on the frequency of 2.437 GHz, and three base stations on the frequency of 2.462 GHz. In this example, each base station is identified by its SSID, which is a user-readable text string assigned to the base station. The signal strength that the WCD receives from each base station is shown parenthetically. Thus, the WCD has measured the strongest received signals from the base stations "FreeWiFi," "Karens," and "Banana_LHA." This may indicate that the WCD is closest to these three base stations.

In addition to the 2.4 GHz frequency band, the WCD may also scan other frequency bands. For instance, in North America the 5 GHz Wifi band consists of a number of channels formed using carrier frequencies in the 5.180 to 5.825 GHz range. Other frequency bands may exist. Consequently, a WCD in North America may scan the 11 frequencies of the 2.4 GHz band and one or more frequencies in the 5 GHz band, for instance. As a result of this scanning, the WCD may identify a group of nearby base stations that use the channels of one or more of these frequency bands.

In any case, the WCD may transmit representations of each of the nearby base stations to a server device, such as server device 300. As noted above, server device 300 may include or have access to location database 314. Location database 314, in turn, may contain a list of known base stations, along with information identifying those base stations and their respective locations.

Location database 314 may also include, for each base station, an indication of whether that base station has been substantially fixed or substantially mobile in past observations. Some Wifi base stations, for example, are substantially fixed, in that they remain in the same general location for months or years at a time. Other Wifi base stations are mobile hot spots that provide, e.g., a Wifi-to-cellular bridge. This latter type of base station may be carried around by individuals or used in automobiles to provide mobile Wifi service. Location database 314 may differentiate between fixed and mobile base stations because the former are expected to be significantly more reliable for location-estimation purposes.

TABLE 3

| SSID | MAC address | GPS coordinates | Fixed/Mobile |
| --- | --- | --- | --- |
| Showroom | 00:0a:95:9d:68:16 | (38.228725, −90.403748) | Fixed |
| BOB | 00:1b:63:84:45:e6 | (38.212541, −90.399628) | Fixed |
| FreeWiFi | 09:00:07:a9:b2:eb | (38.222435, −90.401344) | Fixed |
| Banana_LHA | 00-b0-d0-86-bb-f7 | (38.219333, −90.404778) | Mobile |
| DS-store | 00:1c:b3:09:85:15 | (38.220007, −90.401688) | Fixed |
| Karens | 38-af-8e-28-25-88 | (38.219468, −90.397911) | Mobile |

Table 3 provides an example of the information that location database 314 might contain for each of the base stations shown in Table 2. To that end, Table 3 includes each base station's SSID, MAC address, GPS coordinates, and whether the base station is fixed or mobile. For instance, Table 3 indicates that all of the base stations are associated with a narrow range of GPS coordinates, and all are fixed aside from the base stations with the SSIDs of "Karens" and "Banana_LHA." Thus, when estimating its location, the WCD might disregard these two base stations, or give them a lower weight than the other base stations. While the GPS coordinates in Table 3 include only longitude and latitude, altitude may be includes as well.

Location database 314 may be assembled by receiving reports of base station identifiers, as well as received signal strengths and GPS coordinates, from numerous WCDs. Over time, a reasonably accurate map of the locations of these base stations can be defined. This map can then be used by WCDs to estimate their locations from the base station information, without these WCDs having to using their own GPS transceivers.

Regardless, the process of scanning a set of frequencies, possibly across multiple frequency bands, is power-intensive and may cause battery drain on WCDs. As an alternative, it may be desirable for the WCD to scan a subset of these frequencies instead. In particular, the subset of frequencies may include the frequencies used by the base stations that were identified in the most recent scan of the full set of frequencies. For instance, in the example of Table 2, base stations were only discovered on 3 frequencies out of 11. Thus, in at least some future frequency scans, the WCD may only scan these 3 frequencies.

Alternatively, the subset of frequencies may include the frequencies used by the base stations that were identified in the most recent scan of the full set of frequencies, and that are associated with a received signal strength of 45 or higher. In this case, from the example of Table 2, the subset of frequencies may consist of only 2.437 GHz and 2.462 GHz. In another alternative, the subset of frequencies may include the frequencies used by the base stations that were identified in the most recent scan of the full set of frequencies, are associated with a received signal strength of 45 or higher, and are fixed. In this case, the subset of frequencies may consist of only 2.437 GHz. Other alternatives may exist. The threshold received signal strength of 45 is used herein for purposes of example only, and other values may be used. In some embodiments, a threshold received signal strength value may be explicitly chosen, or may be derived based on the relative RSSI values present in the various signals from one or more base stations.

Regardless of how the subset is selected, subsequent scans of the subset of frequencies may reduce the power used in location-estimation processes, and therefore improve battery life of the WCD. For example, if the WCD scans only 1 frequency instead of 11, the scan may complete more quickly and save power. After scanning the subset of frequencies, the WCD may estimate its location using information related to the base stations discovered during this scan. This scan may be limited to frequencies containing the base stations mostly likely to provide high-quality location estimations (e.g., fixed base stations with high received signal strengths). Therefore, location of the WCD as estimated using this subset of base stations may be as accurate or nearly as accurate as a location estimation using all of the base stations discovered using a full frequency scan.

Figure 5:
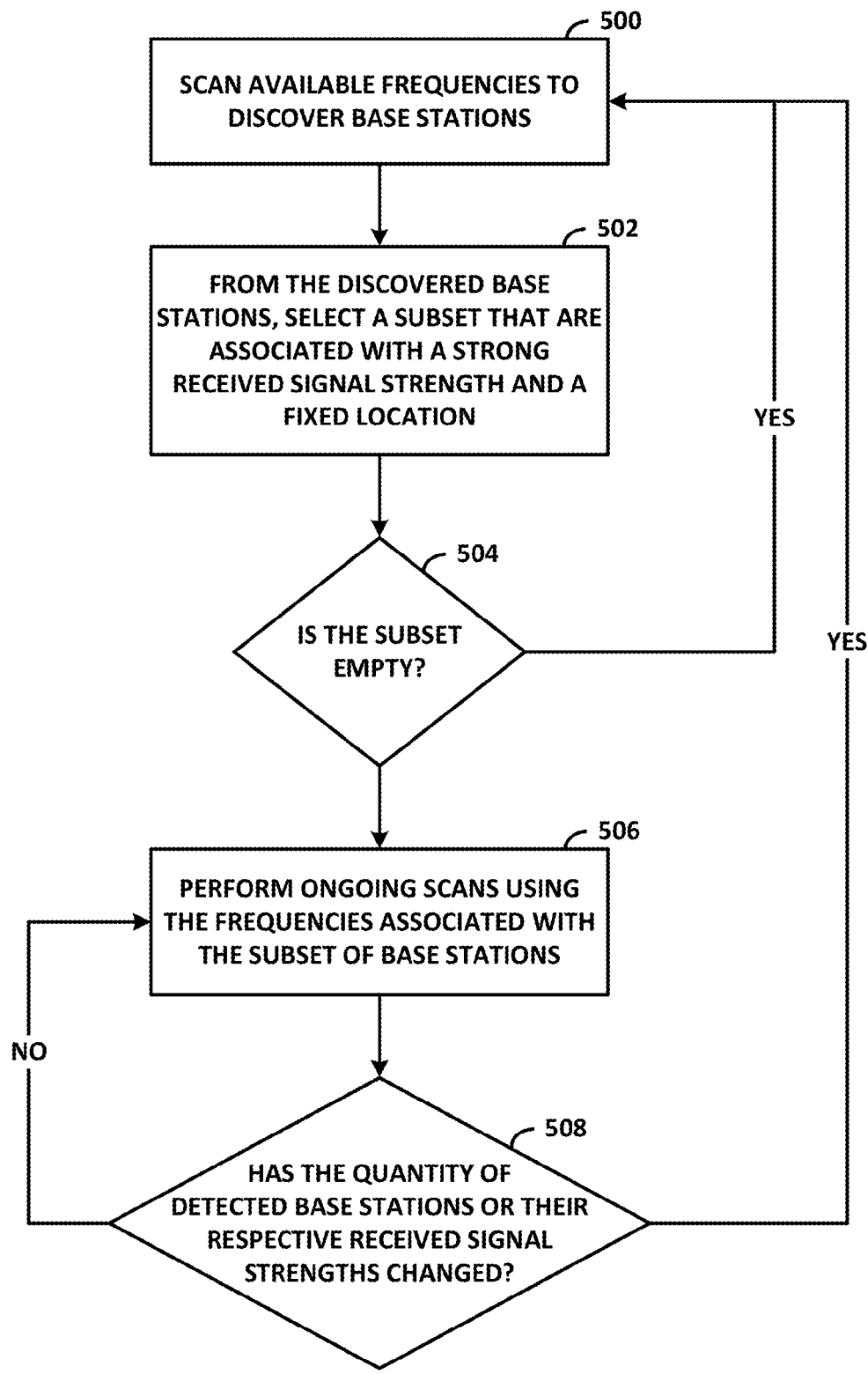
FIG. 5 is a flow chart, according to an example embodiment.

As a further illustration, FIG. 5 is a flow chart of an example embodiment. At block 500, a WCD may scan some or all available frequencies to discover base stations. These frequencies may be in multiple frequency bands. From information relating to the discovered base stations, the WCD may estimate its location. The WCD may communicate with a server device to obtain the information used for the estimation.

At block 502, from the discovered base stations, the WCD may select a subset that are associated with a strong received signal strength (e.g., above a threshold signal strength) and a fixed location. At block 504, whether the subset is empty is tested. If the subset is empty, control is returned to block 500. If the subset is not empty, at block 506 the WCD may perform ongoing scans using the frequencies associated with the subset of base stations.

If some cases, the WCD may test the quality of location information that can be derived from the subset of base stations. For instance, the WCD may determine a difference between the location estimated using the full set of base stations, and the location estimated using the subset of base stations. If these two estimates are not within a threshold distance from one another (e.g., a few feet or a few tens of feet), the WCD may conclude that the subset of base stations is not providing a sufficiently accurate location estimate. Accordingly, control may be returned to block 500, and the WCD may perform at least one further full frequency scan.

At block 508, if the WCD determines that either (i) the quantity of detected base stations has changed, or (ii) the strength at which the WCD receives signals from these base stations has changed by some pre-established threshold, control may return to block 500. If either of these conditions is true, then the WCD may have moved, or the WCD's RF conditions may have changed. Thus, in this case, the WCD performs a re-scan of the full set of frequencies in order to determine whether there is a better subset of base stations that the WCD should be using for location estimation. If these conditions are false, control returns to block 506, and the WCD may continue performing subsequent frequency scans with the subset of frequencies.

The WCD may conclude that the quantity of detected base stations has changed if there is at least one new base station discovered during one of the ongoing scans, or a previously-detected base station fails to be detected during one of these scans. Alternatively, the threshold for making this conclusion may be a different extent of change in the number of base stations detected, e.g., 2, 3, 5, etc., or a percentage change in the number of detected base stations.

5. Example Operations

Figure 6:
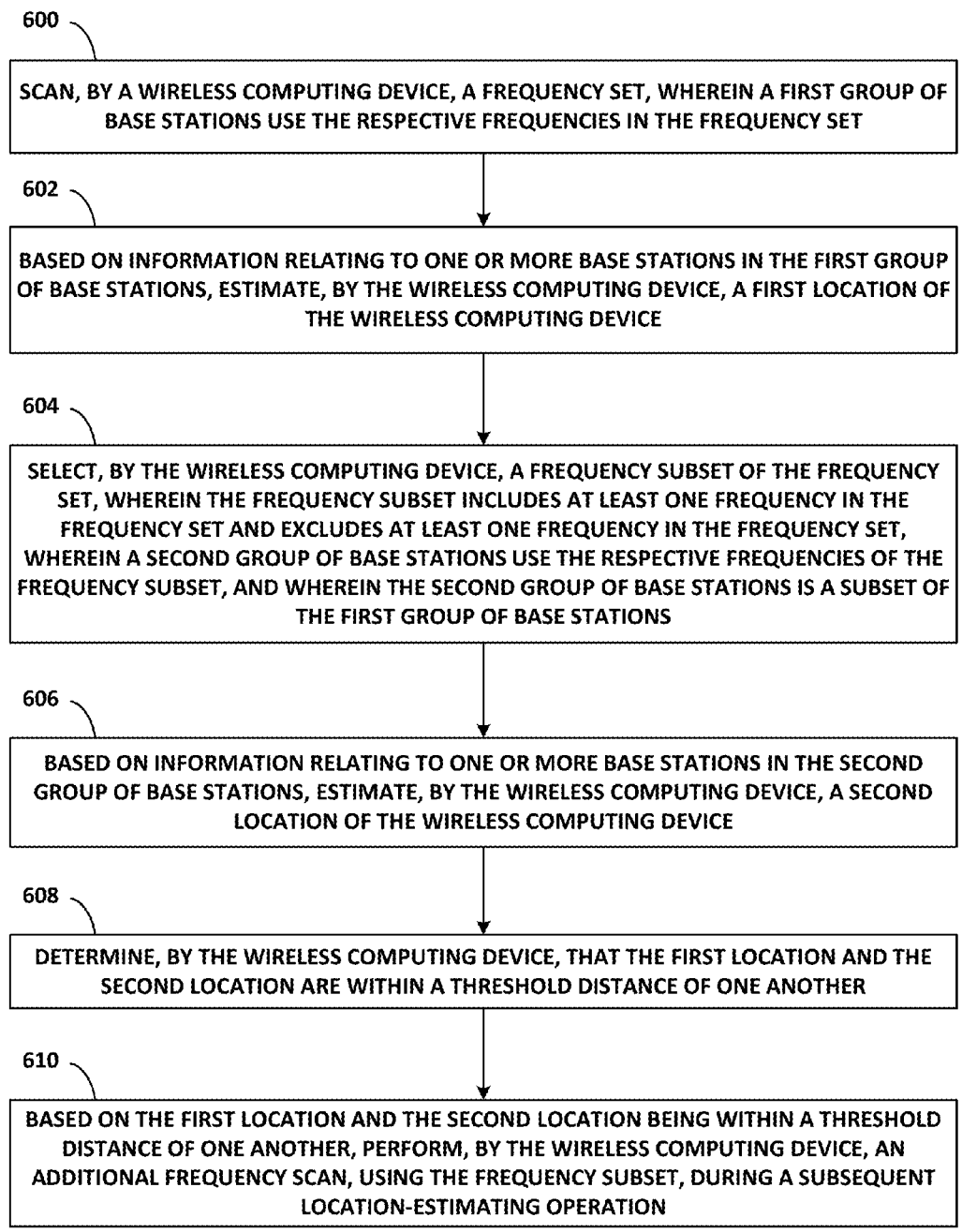
FIG. 6 is another flow chart, according to an example embodiment.

FIG. 6 is a flow chart illustrating an example embodiment. The procedure illustrated by FIG. 6 may be carried out by a computing device, such as WCD 200. However, the procedure can be carried out by other types of devices or device subsystems (e.g., server device 300). Further, the procedure may incorporate any aspect or feature disclosed in this specification or the accompanying drawings.

Block 600 may involve scanning, by a wireless computing device, a frequency set. A first group of base stations may use the respective frequencies in the frequency set. Block 602 may involve, possibly based on information relating to one or more base stations in the first group of base stations, estimating, by the wireless computing device, a first location of the wireless computing device.

Block 604 involves selecting, by the wireless computing device, a frequency subset of the frequency set. The frequency subset may include at least one frequency in the frequency set and may exclude at least one frequency in the frequency set. A second group of base stations may use the respective frequencies of the frequency subset, and the second group of base stations may be a subset of the first group of base stations. The second group of base stations may include one or more base stations from the first group of base stations.

Block 606 may involve, possibly based on information relating to one or more base stations in the second group of base stations, estimating, by the wireless computing device, a second location of the wireless computing device. Block 608 may involve determining, by the wireless computing device, that the first location and the second location are within a threshold distance of one another. Block 610 may involve, possibly based on the first location and the second location being within a threshold distance of one another, performing, by the wireless computing device, an additional frequency scan, using the frequency subset, during a subsequent location-estimating operation.

The subsequent location-estimating operation may include, possibly based on information relating to the one or more base stations in the second group of base stations, (i) estimating, by the wireless computing device, a third location of the wireless computing device, and (ii) providing, by the wireless computing device, the third location to an application operating on the wireless computing device.

Possibly based on the additional frequency scan using the frequency subset, it may be determined that a third group of base stations use the respective frequencies of the frequency subset. The third group of base stations may be different from the second group of base stations. Possibly based on the third group of base stations being different from the second group of base stations, the wireless computing device may re-scan the frequency set during a further location-estimating operation. In some embodiments, there may be more base stations in the third group of base stations than in the second group of base stations. In other embodiments, there may be fewer base stations in the third group of base stations than in the second group of base stations.

In some embodiments, the information relating to the one or more base stations in the first group of base stations includes respective signal strengths, as received by the wireless computing device, of the base stations in the first group of base stations. The frequency subset may be selected such that the base stations in the second group of base stations are associated with respective signal strengths above a non-zero threshold signal strength.

In some embodiments, the information relating to the one or more base stations in the first group of base stations includes respective indications of whether the base stations in the first group of base stations are fixed-position or mobile. The frequency subset may be selected such that the base stations in the second group of base stations are associated with fixed-position indications.

In some embodiments, estimating the first location includes obtaining, from a server device, the information relating to the one or more base stations in the first group of base stations. Selecting the frequency subset may be based on the obtained information received from the server device.

In various embodiments, the threshold distance may be 5 feet or less, 10 feet or less, 25 feet or less, and so on. Also, the frequency set may include frequencies in the 2.4 GHz and 5.0 GHz bands, among other possible frequency bands. Further, the frequency set may include at least 10 channels and the frequency subset may include 3 or fewer channels.

Estimating the first location of the wireless computing device may involve calculating round-trip delays between the WCD and at least one of the base stations in the first group of base stations. Estimating the second location of the wireless computing device may involve calculating round-trip delays between the WCD and at least one of the base stations in the second group of base stations. These round-trip delays may be used to refine the estimates of the first and second locations. For instance, the distance between the wireless computing device and a base station can be estimated by multiplying half of the round-trip delay by the speed of light.

6. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, memory, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
scanning, by a wireless computing device, a frequency set, wherein a first group of base stations use the respective frequencies in the frequency set;
based on information relating to one or more base stations in the first group of base stations, estimating, by the wireless computing device, a first location of the wireless computing device;
selecting, by the wireless computing device, a frequency subset of the frequency set, wherein the frequency subset includes at least one frequency in the frequency set and excludes at least one frequency in the frequency set, wherein a second group of base stations use the respective frequencies of the frequency subset, and wherein the second group of base stations is a subset of the first group of base stations;
based on information relating to one or more base stations in the second group of base stations, estimating, by the wireless computing device, a second location of the wireless computing device;
determining, by the wireless computing device, that the first location and the second location are within a threshold distance of one another;
based on the first location and the second location being within a threshold distance of one another, performing, by the wireless computing device, an additional frequency scan, using the frequency subset, during a subsequent location-estimating operation;
based on the additional frequency scan using the frequency subset, determining that a third group of base stations use the respective frequencies of the frequency subset, wherein the third group of base stations is different from the second group of base stations; and
based on the third group of base stations being different from the second group of base stations, re-scanning the frequency set during a further location-estimating operation.

2. The method of claim 1, wherein the subsequent location-estimating operation comprises:
based on information relating to the one or more base stations in the second group of base stations, estimating, by the wireless computing device, a third location of the wireless computing device; and
providing, by the wireless computing device, the third location to an application operating on the wireless computing device.

3. The method of claim 1,
wherein the information relating to one or more base stations in the first group of base stations is stored in a database of access point coverage, and wherein estimating the first location of the wireless computing device comprises estimating the first location of the wireless computing device using the database of access point coverage.

4. The method of claim 1, wherein there are more base stations in the third group of base stations than in the second group of base stations.

5. The method of claim 1, wherein there are fewer base stations in the third group of base stations than in the second group of base stations.

6. The method of claim 1, wherein the information relating to the one or more base stations in the first group of base stations includes respective signal strengths, as received by the wireless computing device, of the base stations in the first group of base stations, and wherein the frequency subset is selected such that the base stations in the second group of base stations are associated with respective signal strengths above a non-zero threshold signal strength.

7. The method of claim 1, wherein the information relating to the one or more base stations in the first group of base stations includes respective indications of whether the base stations in the first group of base stations are fixed-position or mobile, and wherein the frequency subset is selected such that the base stations in the second group of base stations are associated with fixed-position indications.

8. The method of claim 1, wherein estimating the first location comprises obtaining, from a server device, the information relating to the one or more base stations in the first group of base stations, and wherein selecting the frequency subset is based on the obtained information received from the server device.

9. The method of claim 1, wherein the threshold distance is 5 feet or less.

10. The method of claim 1, wherein the frequency set includes frequencies in the 2.4 GHz and 5.0 GHz bands.

11. The method of claim 1, wherein the frequency set includes at least 10 channels and the frequency subset includes 3 or fewer channels.

12. The method of claim 1, wherein estimating the first location of the wireless computing device comprises calculating round trip delays between the WCD and at least one of the base stations in the first group of base stations, and wherein estimating the second location of the wireless computing device comprises calculating round trip delays between the WCD and at least one of the base stations in the second group of base stations.

13. An article of manufacture including a non-transitory computer-readable medium, having stored thereon program instructions that, upon execution by a wireless computing device, cause the wireless computing device to perform operations comprising:
scanning a frequency set, wherein a first group of base stations use the respective frequencies in the frequency set;
based on information relating to one or more base stations in the first group of base stations, estimating a first location of the wireless computing device;
selecting a frequency subset of the frequency set, wherein the frequency subset includes at least one frequency in the frequency set and excludes at least one frequency in the frequency set, wherein a second group of base stations use the respective frequencies of the frequency subset, and wherein the second group of base stations is a subset of the first group of base stations;
based on information relating to one or more base stations in the second group of base stations, estimating a second location of the wireless computing device;
determining that the first location and the second location are within a threshold distance of one another;
based on the first location and the second location being within a threshold distance of one another, performing an additional frequency scan, using the frequency subset, during a subsequent location-estimating operation;
based on the additional frequency scan using the frequency subset, determining that a third group of base stations use the respective frequencies of the frequency subset, wherein the third group of base stations is different from the second group of base stations; and
based on the third group of base stations being different from the second group of base stations, re-scanning the frequency set during a further location-estimating operation.

14. The article of manufacture of claim 13, wherein the subsequent location-estimating operation comprises:
based on information relating to the one or more base stations in the second group of base stations, estimating a third location of the wireless computing device; and
providing, by the wireless computing device, the third location to an application operating on the wireless computing device.

15. The article of manufacture of claim 13, wherein the information relating to one or more base stations in the first group of base stations is stored in a database of access point coverage, and wherein estimating the first location of the wireless computing device comprises estimating the first location of the wireless computing device using the database of access point coverage.

16. The article of manufacture of claim 13, wherein the information relating to the one or more base stations in the first group of base stations includes respective indications of whether the base stations in the first group of base stations are fixed-position or mobile, and wherein the frequency subset is selected such that the base stations in the second group of base stations are associated with fixed-position indications.

17. A wireless computing device comprising:
at least one processor;
memory; and
program instructions, stored in the memory, that upon execution by the at least one processor cause the wireless computing device to perform operations comprising:
scanning a frequency set, wherein a first group of base stations use the respective frequencies in the frequency set;
based on information relating to one or more base stations in the first group of base stations, estimating a first estimated location of the wireless computing device;
selecting a frequency subset of the frequency set, wherein the frequency subset includes at least one frequency in the frequency set and excludes at least one frequency in the frequency set, wherein a second group of base stations use the respective frequencies of the frequency subset, and wherein the second group of base stations is a subset of the first group of base stations;
based on information relating to one or more base stations in the second group of base stations, estimating a second location of the wireless computing device;
determining that the first location and the second location are within a threshold distance of one another;
based on the first location and the second location being within a threshold distance of one another, performing an additional frequency scan, using the frequency subset, during a subsequent location-determining operation;
based on the additional frequency scan using the frequency subset, determining that a third group of base stations use the respective frequencies of the frequency subset, wherein the third group of base stations is different from the second group of base stations; and based on the third group of base stations being different from the second group of base stations, re-scanning the frequency set during a further location-estimating operation.

18. The wireless computing device of claim 17, wherein the subsequent location-estimating operation comprises:

based on information relating to the one or more base stations in the second group of base stations, estimating a third location of the wireless computing device; and providing, by the wireless computing device, the third location to an application operating on the wireless computing device.

19. The wireless computing device of claim 17, the operations further comprising:

wherein the information relating to one or more base stations in the first group of base stations is stored in a database of access point coverage, and wherein estimating the first location of the wireless computing device comprises estimating the first location of the wireless computing device using the database of access point coverage.

20. The wireless computing device of claim 17, wherein the information relating to the one or more base stations in the first group of base stations includes respective indications of whether the base stations in the first group of base stations are fixed-position or mobile, and wherein the frequency subset is selected such that the base stations in the second group of base stations are associated with fixed-position indications.

* * * * *